Patented Feb. 18, 1941

2,231,990

UNITED STATES PATENT OFFICE 2,231,990

MANUFACTURE OF HYDROCARBONS

Henry Dreyfus, London, England

No Drawing. Application July 20, 1938, Serial No. 220,345. In Great Britain August 5, 1937

6 Claims. (Cl. 260—449)

This invention relates to the manufacture of hydrocarbons by reaction between carbon monoxide and hydrogen.

When mixtures of carbon monoxide and hydrogen are heated at a suitable temperature in the presence of strongly hydrogenating catalysts, different products are formed according to the conditions employed. Thus at relatively high temperatures and under atmospheric pressure, methane is produced in large quantities, while at lower temperatures normally liquid hydrocarbons are the main products. For example, using a nickel catalyst, at temperatures of 230° to 250° C. methane is produced, while at temperatures of 160° to 180° C. normally liquid hydrocarbons are the main products.

There is, however, one difficulty which arises in carrying out the synthesis of normally liquid hydrocarbons from carbon monoxide and hydrogen. It is found that the catalyst used gradually loses its initial activity and after a more or less short period becomes commercially useless and must be regenerated. It is believed that this gradual poisoning of the catalyst is due, at least in large part, to the deposition or formation thereon of wax-like materials which reduce the active surface available for catalysing the reaction.

In U. S. application S. No. 207,576 filed May 12, 1938, a process is described in which the synthesis of hydrocarbons from carbon monoxide and hydrogen is carried out under an absolute pressure below atmospheric, especially a pressure below about 0.25 atmosphere, for example 0.1 atmosphere, in order to prolong the active life of the catalyst.

According to the present invention the reaction is carried out under an absolute pressure which is at the least normally above 0.5 atmosphere, but which is periodically reduced to below 0.5 atmosphere. By this means more material may be treated in an apparatus of any given size than when the reaction is carried out entirely under a low absolute pressure.

In carrying out the new process the reaction may with advantage be allowed to proceed under about atmospheric pressure or a higher pressure until the activity of the catalyst, and consequently the rate at which the hydrocarbons are formed and the hydrocarbon content of the gases and vapours leaving the reaction zone, begin to fall off; the absolute pressure in the apparatus may then be reduced, preferably to between 0.25 and 0.1 atmosphere or lower, until the catalyst has sufficiently recovered its activity, whereupon the absolute pressure may again be raised to a value in the neighbourhood of atmospheric pressure or higher.

Although it is preferred to continue passing the reactant gases over or through the catalyst during the low pressure periods, so as not to interrupt completely the production of hydrocarbons, this is not essential. For example, the reactant gases may be replaced by relatively inert gases or vapours, e. g. nitrogen or steam. Since the regeneration of the catalyst is facilitated by a flow of gas, whether reactant gas or an inert gas or vapour, it is better to maintain a stream of reactant or other gas rather than to interrupt the flow of gas during the low pressure period, although this may be done if desired whether or not the reactant gases are replaced by inert gases or vapours.

Preferably the synthesis is carried out in the presence of a diluent whereby the partial pressure of the reactants and products, desired and/or undesired, is reduced. For example, the carbon monoxide and hydrogen may, before entering the reaction zone, be diluted with nitrogen or better still with a gas or vapour which is chemically related to the carbon monoxide or the hydrogen, for instance carbon dioxide or steam or hydrocarbon gases or vapours. The diluent may, if desired, comprise hydrocarbons produced from carbon monoxide and hydrogen in an earlier stage or operation. The amount of diluent may, for example, be 1½, 3, 5 or 10 or more parts by volume for each part of carbon monoxide.

The conditions employed in the synthesis depend on the products which are desired. As catalysts there may be employed metals of Group 8. For example cobalt and iron are particularly useful when it is desired to produce normally liquid hydrocarbons, while nickel is most valuable when methane is to be produced. The catalysts may, for example, be activated with alumina, thoria, magnesia, zinc oxide or other activating agents. The catalysts, whether alone or mixed with other catalysts or with activating agents, may be employed in association with a carrier; for example they may be deposited on charcoal, silica gel, pumice, asbestos or the like. On the other hand, self-supporting catalyst masses may be used with advantage, and in particular a special nickel-alumina or similar catalyst prepared in the cold as described in U. S. application S. No. 106,612 filed October 20, 1936, is particularly useful for making methane; analogous methods of making iron and especially cobalt catalysts may be adopted when normally liquid hydrocarbons are to be the main products.

The temperature employed may, for example, be between 150° and 300° C. and like the catalyst the exact temperature depends on the products required. For example, when employing an activated cobalt catalyst to produce normally liquid hydrocarbons a temperature of the order of 180° to 200° C. may be employed, while similar products are produced using an activated iron catalyst at temperatures in the neighbourhood of 250° C. On the other hand, when it is desired to produce methane a nickel-alumina catalyst may be employed at a temperature of, for example, about 350° C.

The hydrogen and carbon monoxide in the initial gas mixture may be present in approximately equal amounts, but preferably an excess of hydrogen is used. For example good results are obtained by using twice as much hydrogen as carbon monoxide by volume, but mixtures containing still higher proportions of hydrogen, for example three or four times as much hydrogen as carbon monoxide, may be used if desired. Generally speaking, the higher the proportion of hydrogen the greater the tendency to produce methane. Thus an increase in the proportion of hydrogen may with advantage be accompanied by a decrease in the temperature employed if it is desired to produce normally liquid hydrocarbons. A decrease in the proportion of hydrogen tends to increase the proportion of unsaturated hydrocarbons produced.

The reaction may, for example, be carried out by passing the gas mixtures through heated tubes containing the catalyst. Preferably the dimensions and structure of the tubes are such that a high degree of turbulence is imparted to the gas so as to ensure good contact between the gas and the catalyst and to secure efficient heating throughout the gas mixture. For example relatively narrow tubes may be used with a high rate of gas flow, or masses of catalyst may be so disposed as to break up the gas stream. A similar effect may be attained by inserting baffles at suitable intervals along the length of the reaction tube. If desired the interior of the reaction tube and/or any baffles contained therein may be made of or lined with a catalytic metal. Instead of tubes there may be used reaction zones of annular cross-section or any other suitable type of apparatus.

The gas may be subjected to a single passage through the reaction zone, especially when it is desired to produce methane. However, when normally liquid hydrocarbons are to be produced, and therefore lower temperatures are employed, the reaction may proceed somewhat more slowly and it may therefore be advisable to subject the gas mixture repeatedly to the reaction conditions either by passing it through a number of reaction zones or by recycling it through a single reaction zone. Between the successive passages through the reaction zones or between successive cycles in a recycling process normally liquid hydrocarbons may be condensed out of the gas mixture and so removed. If desired a certain proportion of such normally liquid hydrocarbons may be allowed to remain in the gas mixture or may be returned thereto to act as diluent.

The following examples illustrate the invention without in any way limiting it.

*Example 1*

Carbon monoxide mixed with twice its volume of hydrogen, and with or without three times its volume of steam or of carbon dioxide, is passed under atmospheric pressure through a tube which is heated to 180° C. and which contains a catalyst mass consisting of cobalt activated with thoria. When after a number of hours the proportion of hydrocarbons in the gases and vapours leaving the reaction zone begins to drop appreciably, the pressure on the gases passing through the reaction zone is reduced to 0.1 atmosphere. The period of low pressure required to reactivate the catalyst must be determined for each particular case, depending as it does on the nature of the gas mixture, the properties of the catalyst, and the other reaction conditions. Usually it is short as compared with the period of running at normal pressure. The gases and vapours leaving the reaction zone during both normal and low pressure periods are cooled, and the greater part of the hydrocarbons formed is condensed. The gases and vapours remaining, consisting for the most part of unchanged carbon monoxide and hydrogen, together with the diluent if such is used, with some light hydrocarbons and usually a little carbon dioxide formed in the reaction, are mixed with fresh carbon monoxide and hydrogen and again passed over the catalyst.

*Example 2*

Carbon monoxide mixed with twice its volume of hydrogen and three times its volume of steam is passed over a cobalt-thoria catalyst as described in Example 1. When the activity of the catalyst, as indicated by the proportion of hydrocarbons in the gases and vapours leaving the reaction zone, begins to fall off, the supply of carbon monoxide and hydrogen is interrupted, and only steam, under a pressure of 0.1 atmosphere, is passed in contact with the catalyst to restore its activity. When the activity of the catalyst has been restored the reaction-reactivation cycle is started afresh.

Having described my invention, what I desire to secure by Letters Patent is:

1. Process for the manufacture of hydrocarbons by reaction between carbon monoxide and hydrogen in the presence of a hydrogenating catalyst, wherein the absolute pressure in the reaction zone is normally above 0.5 atmosphere, but is periodically reduced to below 0.5 atmosphere without interrupting the flow of the reactant gases whenever the activity of the catalyst falls considerably.

2. Process for the manufacture of hydrocarbons by reaction between carbon monoxide and hydrogen in the presence of a hydrogenating catalyst, wherein the absolute pressure in the reaction zone is normally above 0.5 atmosphere, but is periodically reduced to between 0.1 and 0.25 atmosphere without interrupting the flow of the reactant gases whenever the activity of the catalyst falls considerably.

3. Process for the manufacture of hydrocarbons by reaction between carbon monoxide and hydrogen in the presence of a hydrogenating catalyst, wherein the absolute pressure in the reaction zone is normally about one atmosphere, but is periodically reduced to below 0.5 atmosphere without interrupting the flow of the reactant gases whenever the activity of the catalyst falls considerably.

4. Process for the manufacture of hydrocarbons by reaction between carbon monoxide and hydrogen in the presence of a hydrogenating catalyst, wherein the absolute pressure in the reaction zone is normally about one atmosphere, but is periodically reduced to between 0.1 and 0.25 atmosphere without interrupting the flow of the reactant gases whenever the activity of the catalyst falls considerably.

5. Process for the manufacture of hydrocarbons by reaction between carbon monoxide and hydrogen in the presence of a hydrogenating catalyst, wherein the reaction is carried out under a pressure about one atmosphere until the rate of reaction begins to fall off appreciably, whereupon the pressure is reduced to below 0.5 atmosphere without interrupting the flow of the reactant gases, until the catalyst activity is restored, and is then raised to and maintained at its former value, and the cycle repeated.

6. Process for the manufacture of hydrocarbons by reaction between carbon monoxide and hydrogen in the presence of a hydrogenating catalyst, wherein the reaction is carried out under a pressure about one atmosphere until the rate of reaction begins to fall off appreciably, whereupon the pressure is reduced to between 0.1 and 0.25 atmosphere without interrupting the flow of the reactant gases, until the catalyst activity is restored, and is then raised to and maintained at its former value, and the cycle repeated.

HENRY DREYFUS.